United States Patent [19]

Koseki

[11] Patent Number: 4,893,780
[45] Date of Patent: Jan. 16, 1990

[54] GAS BLOWER SUPPORT DEVICE FOR LASER GENERATORS

[75] Inventor: Ryoji Koseki, La Habra, Calif.
[73] Assignee: Amada Company, Limited, Japan
[21] Appl. No.: 210,574
[22] Filed: Jun. 21, 1988
[51] Int. Cl.$^4$ .............................................. F16M 13/00
[52] U.S. Cl. .................................. 248/638; 248/647; 248/566; 248/550
[58] Field of Search ............... 248/638, 647, 649, 654, 248/657, 659, 631, 575, 566, 550

[56] References Cited

U.S. PATENT DOCUMENTS

| | | | |
|---|---|---|---|
| 1,526,045 | 2/1925 | Brown | 248/657 X |
| 3,281,101 | 10/1966 | May | 248/550 |
| 3,589,655 | 6/1971 | Hackbarth | 248/638 X |
| 3,917,201 | 11/1975 | Roll | 248/550 |
| 4,336,917 | 6/1982 | Phillips | 248/550 |
| 4,364,695 | 12/1982 | Lenz | 248/647 X |
| 4,713,714 | 12/1987 | Gatti et al. | 248/638 X |
| 4,730,541 | 3/1988 | Greene | 248/550 X |

Primary Examiner—Ramon S. Britts
Assistant Examiner—Karen J. Chotkowski
Attorney, Agent, or Firm—Wigman & Cohen

[57] ABSTRACT

A blower support device for supporting a blower on the frame of a laser generator includes a plurality of air-mounted isolators disposed on the laser generator frame, an air-mounted base supported by the plurality of air-mounted isolators, and a plurality of guide rails provided on the air-mounted base for supporting a surface of the air-mounted base. A plurality of wheels are provided on the blower and engaged with the guide rails. The blower support device may also include an air pressure source and regulator for constant supply of air pressure and individually and freely regulated air pressure to the air-mounted isolators.

2 Claims, 4 Drawing Sheets

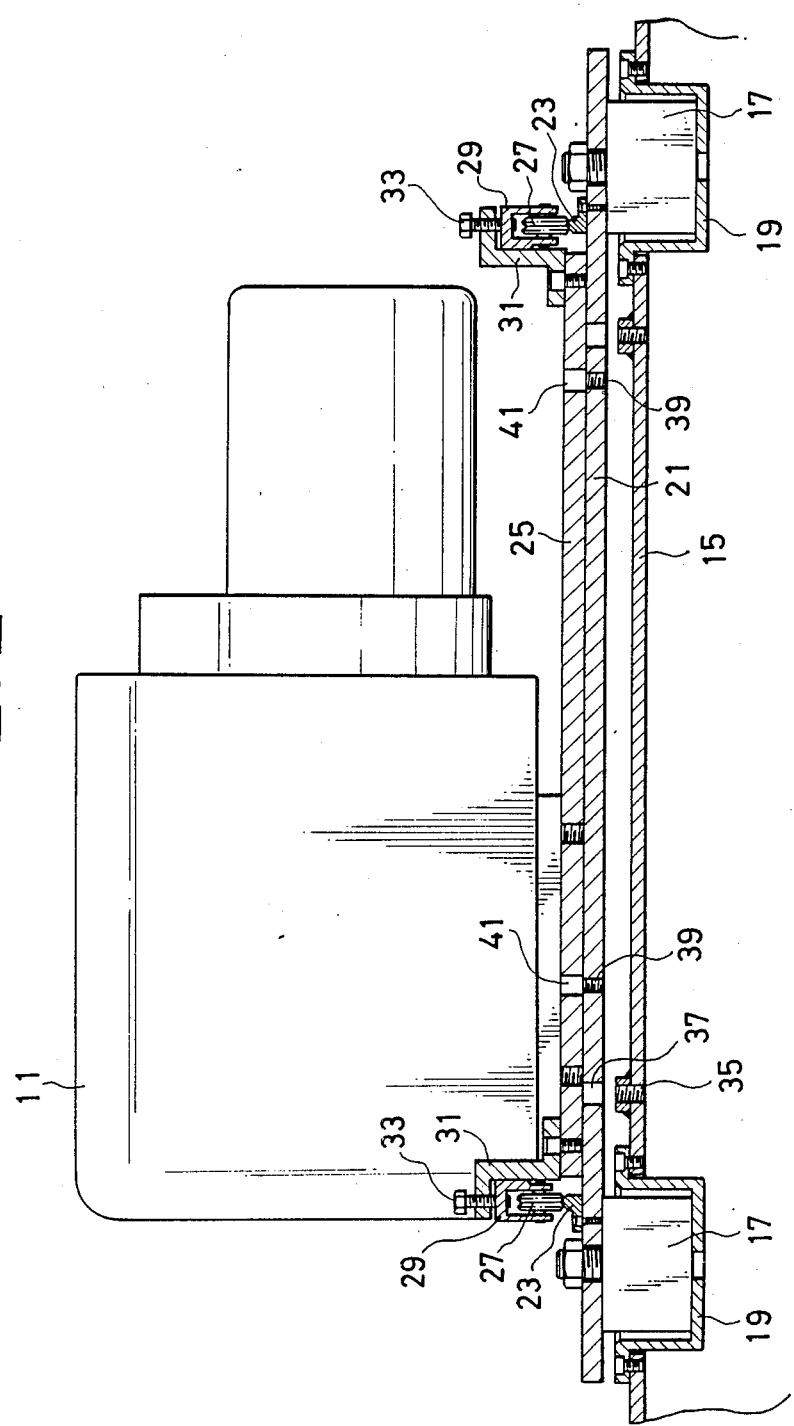

GAS BLOWER SUPPORT DEVICE FOR LASER GENERATORS

BACKGROUND OF THE INVENTION

1. Field of the Invention

The present invention relates to a device which supports a blower in a gas laser generator, and more specifically to a support device which can effectively eliminate vibrations from the blower.

2. Description of the Prior Art

Many types of gas lasers generator are commonly known. For example, in $CO_2$ gas laser generators a high-speed axial flow type, a triaxial orthogonal type and the like are known.

In the high-speed axial flow type of gas laser generator in particular, in order to cause the laser gas to flow at high speed through the laser tube of the laser generator, a blower with a high flow rate and a high compression ratio is used. However, when the blower is activated, it produces severe vibrations that have adverse effects on the optical system of the laser generator. Therefore, in order to offset these adverse effects, the blower is supported by antivibration rubber on the frame of the laser generator.

In conventional mechanisms using antivibration rubber to support the blower in order to prevent the propagation of vibrations from the blower to the frame of the laser generator, a vibration damping efficiency of only about 75% to 80% can be realized. In other words, problems can arise from the approximate 20% to 25% of vibrations that reach the frame of the laser generator through the vibration preventing rubber. In addition, there is the problem that antivibration rubber does not perform well in preventing low frequency vibrations.

Moreover, since the blower is installed directly on the frame of the laser generator by using antivibration rubber, horizontal adjustment of the blower is troublesome, and this also makes it very difficult to remove the blower for routine maintenance inspection.

SUMMARY OF THE INVENTION

An object of the present invention is to provide, with due consideration to the drawbacks of such conventional devices, a blower support device which prevents virtually all vibrations produced by the blower from propagating to the frame of the laser generator.

Another object of the present invention is to provide a blower support device which enables the air mount base for supporting the blower to be held horizontally with ease.

Still another object of the present invention is to provide a blower support device which enables the blower to be easily removed from the frame of the laser generator.

These objects are accomplished in the present invention by providing a plurality of guide rails on an air-mounted base which supports a frame for a laser generator through a plurality of air-mounted isolators, wherein the blower is mounted on an intermediate plate which is supported on the guide rails so as to be freely movable therealong.

In the blower support device, by individually adjusting the pressure of air supplied to the plurality of air-mounted isolators, the air-mounted base can be adjusted horizontally with respect to the frame of the laser generator. In addition, the blower mounted on the intermediate plate can easily be removed along a side direction from the frame of the laser generator by the movement of the intermediate plate along the guide rails provided on the air-mounted base.

BRIEF DESCRIPTION OF THE DRAWINGS

These and other objects, features, and advantages of the present invention will become more apparent from the following description of the preferred embodiments taken in conjunction with the accompanying drawings, in which:

FIG. 2 is a sectional drawing showing the main part of the support section of the blower.

DETAILED DESCRIPTION OF THE PREFERRED EMBODIMENTS

Figure 1:
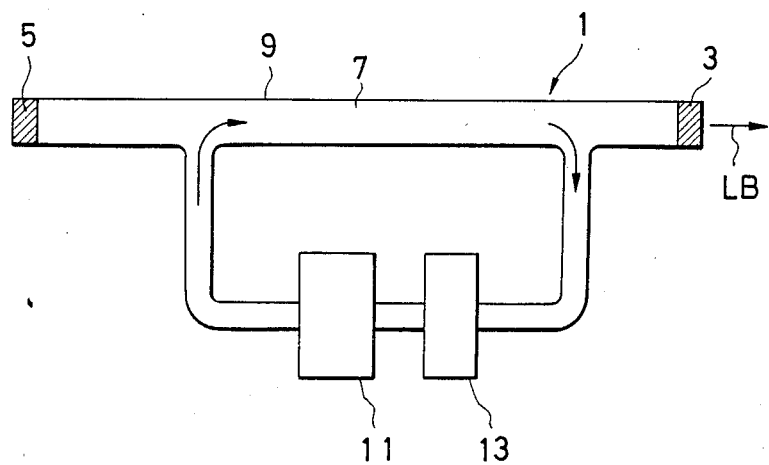
FIG. 1 is an explanatory drawing showing the general configuration of a laser generator.

Now referring to FIG. 1, as shown in the outline of the diagram, a high speed axial flow laser generator 1 comprises an output mirror 3, a reflective mirror 5, and a laser tube 9 provided with an electric discharge section 7. In the laser tube 9, a Rootes blower 11 for circulating a laser gas at high speed, and a heat exchanger 13 for cooling the laser gas, are connected in series.

In this configuration, the blower 11 is activated to circulate the laser gas inside the laser tube at high speed, and a laser beam LB is generated by the excitation of the laser gas in the discharge section. As this type of high-speed axial-flow laser generator is well known, a more detailed explanation will be omitted.

However, when the blower 11 in the laser generator 1 is driven, vibrations are generated and propagate throughout the entire laser generator 1. This is a problem. Accordingly, in the present invention, the blower 11 is supported by the configuration shown in FIG. 2.

As is shown in detail in FIG. 2, a plurality of cylindrical support bases 19, each of which supports an air-mounted isolator (air spring) 17, are mounted at a plurality of locations (four locations) on a frame 15 of the laser generator 1. Each of the air-mounted isolators 17, which collectively support an air-mounted base 21, is housed in one of the support bases 19. These air-mounted isolators 17 are identical to conventional air springs, so a detailed explanation of their structure has been omitted.

A pair of guide rails 23 are provided on the air-mounted base 21. An intermediate plate 25 which supports the blower 11 is removably supported on these guide rails 23 through a plurality of wheels 27 so as to be movable along the guide rails 23. Each of these wheels 27 is mounted in a yoke bracket 29. The yoke bracket 29 is mounted on a Z-shaped bracket 31, which is secured to the intermediate plate 25, through a jack bolt 33 in a manner which allows relatively free adjustment in the vertical direction.

In addition, a plurality of bolt through-holes 37, corresponding to a plurality of threaded holes 35 penetrating the frame 15, penetrate the air-mounted base 21.

Moreover, a plurality of threaded holes 39 are provided at a plurality of locations in the air-mounted base 21, and a bolt through-hole 41 penetrates the intermediate plate 25 at each location corresponding to a threaded hole 39.

By means of this configuration, when the air within each air-mounted isolator 17 is discharged, each of the through-holes 37 in the air-mounted base 21 can be penetrated by a bolt to secure the air-mounted base 21 relative to the frame 15. Also, a bolt can penetrate each through-hole 41 in the intermediate plate 25. By screwing these bolts into the threaded holes 39 in the air-mounted base 21 the intermediate plate 25 can be secured relative to the air-mounted base 21.

Specifically, by securing the air-mounted base 21 relative to the frame 15, and by securing the intermediate plate 25 relative to the air-mounted base 21, there are no moving parts during transport, so transport can be easily carried out.

After releasing the air-mounted base 21 from its secured status relative to the frame 15, it is possible to maintain a floating status for the air-mounted base 21 relative to the frame 15 by supplying compressed air to each air-mounted isolator 17. Accordingly, the propagation of vibrations from the blower 11 in the frame 15 can be prevented. The vibration prevention ratio in this case is 98% or greater. Compared to the use of rubber in a conventional system, this vibration prevention ratio is exceedingly high.

Figure 3:
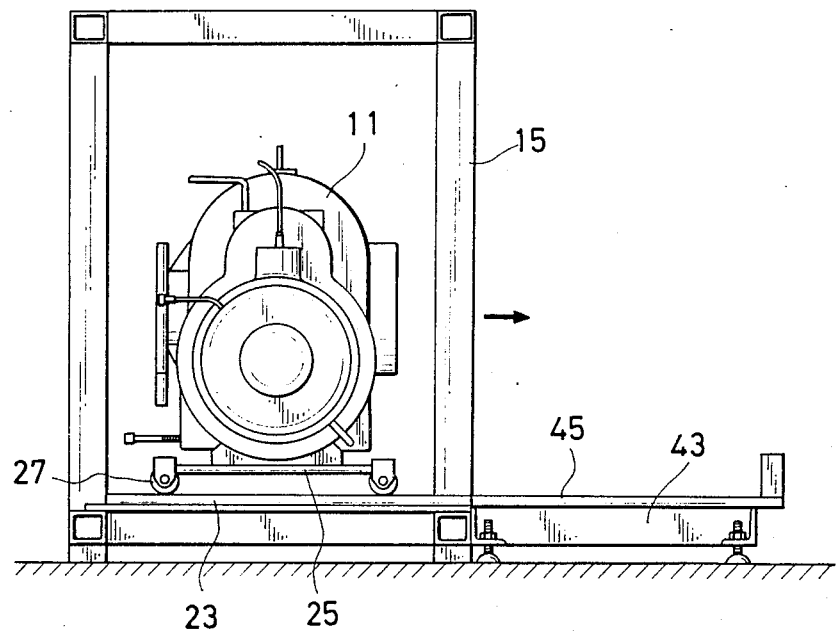
FIG. 3 is an explanatory drawing of the main part showing the action of removing the blower from the side direction.

Also, by releasing the intermediate plate 25 from its secured status relative to the air-mounted base 21, and by adjusting each of the jack bolts 33, it is possible to suitably elevate the intermediate plate 25 with respect to the air-mounted base 21 so that the intermediate plate 25 can move easily along the guide rails 23. Accordingly, as shown in FIG. 3 for example, by providing a maintenance frame 43 at a location adjacent to the frame 15, and by providing a pair of guide rails 45 on this maintenance frame 43 aligned with the guide rails 23 on the air-mounted base 21, the blower 11 can be removed and positioned easily on the maintenance frame 43. Specifically, it is easy to carry out routine maintenance inspections on the blower 11.

Figure 5:
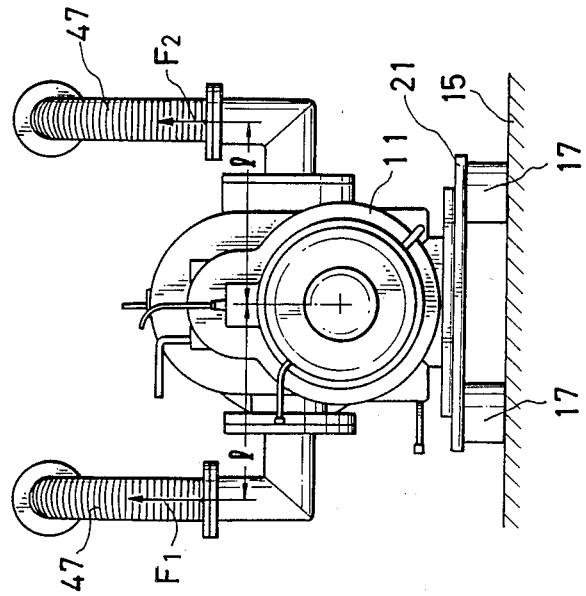
FIG. 5 is a side elevational view showing the piping of the blower from the right hand side of FIG. 4.
Figure 4:
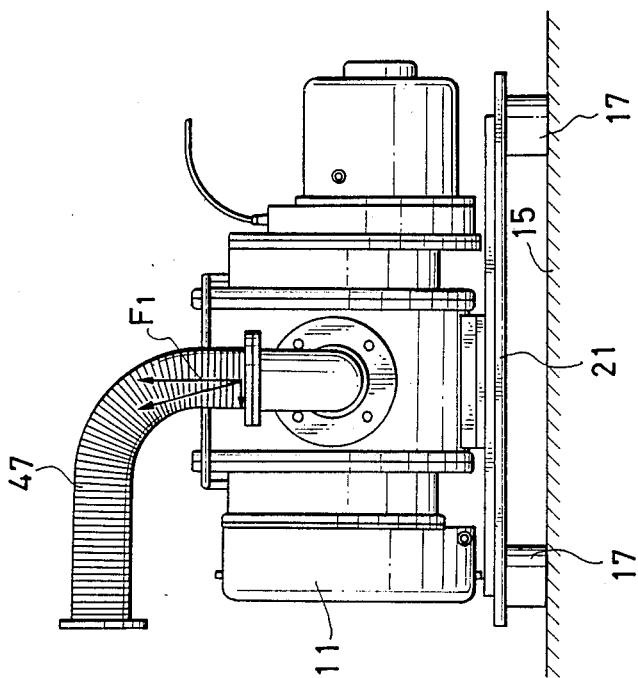
FIG. 4 is a front elevational view showing the piping of the blower.

With this configuration, most of the vibrations from the blower 11 can be prevented from propagating to the laser generator 1. However, some vibrations from the blower 11 reach the frame of the laser generator through the suction and exhaust pipings for the laser gas. Accordingly, in the present invention, as indicated in FIG. 4 and FIG. 5, a pair of bellow-like plastic hoses 47a, 47b of high flexibility are used as pipings. By using the hoses 47 as pipings, the propagation of vibrations from the blower 11 through the pipings is prevented.

However, when the blower is operated, the hoses 47a, 47b will have a tendency to contract, resulting in the generation of vertical forces $F_1$ and $F_2$. Since the compression ratio of the suction side to the exhaust side of the blower 11 is larger than four ($R>4$), the magnitude of the vertical force $F_1$ on the suction side will be larger than that of the vertical force $F_2$ on the exhaust side. Thus, a bending moment M ($M=(F_1-F_2)$) exists on the blower 11, resulting in that the blower 11 will have a tendency to lean to the right side.

In such a case, it is desirable to maintain the blower 11 in a horizontal position so that there is no loss of the antivibration effect. Accordingly, in this embodiment of the present invention the configuration is such that the pressure of the compressed air supplied to each air-mounted isolator 17 can be freely and individually regulated to adjust horizontally the air-mounted base 21 which supports the blower 11.

Figure 6:
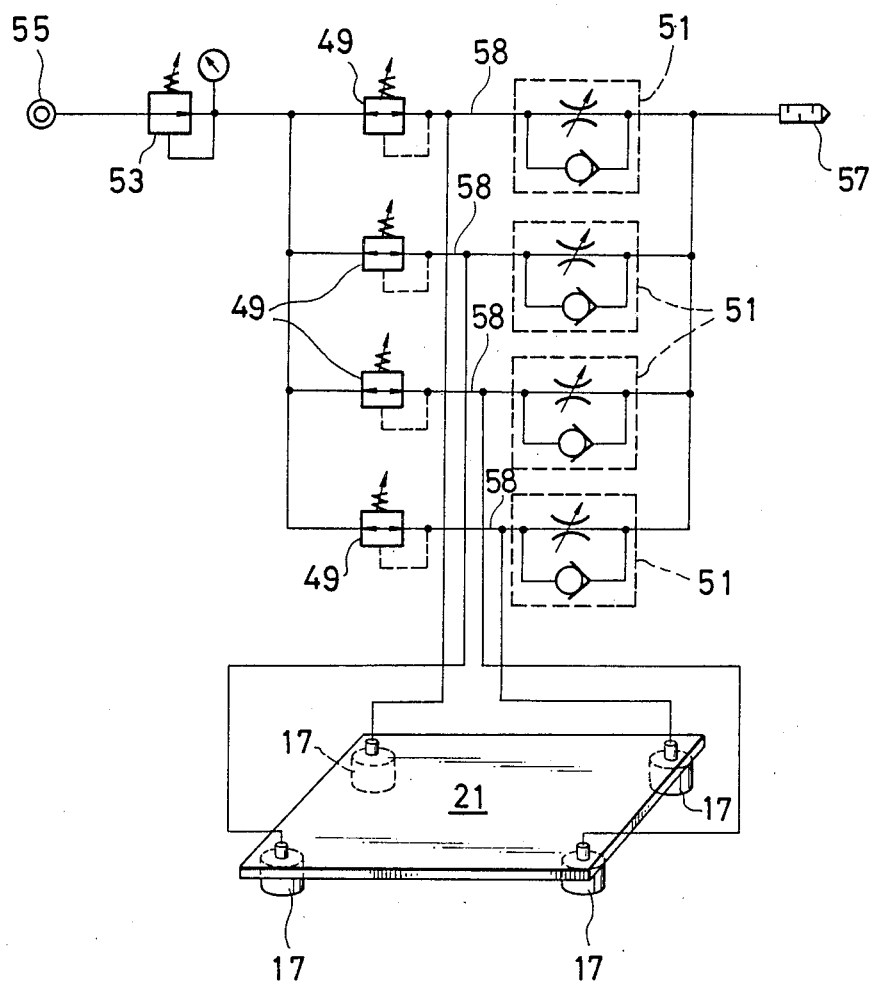
FIG. 6 is an explanatory drawing showing the pneumatic circuit for the air-mounted isolator.

As shown in more detail in FIG. 6, each air-mounted isolator 17 is connected to a branch between a fine regulating pressure reducing valve 49 and a throttling valve 51 provided with a check valve. Each fine regulating pressure reducing valve 49 and each throttling valve 51, as shown in FIG. 6, are respectively connected in parallel. Each fine regulating pressure reducing valve 49 is connected to an air source 55 through a main pressure reducing valve 53. In addition, each throttling valve 51 is connected to an exhaust muffler 57.

By this configuration, the compressed air from the air source 55 is reduced to the prescribed pressure by the main reducing valve 53. Thereafter, the pressures are regulated individually by each fine regulating pressure reducing valves 49, and the air is discharged through the exhaust muffler 57 via each throttling valve 51. Specifically, by the continuous discharge of small amounts of compressed air from the pressure reducing valve to each pneumatic line 58 between each pressure reducing valve 49 and each throttling valve 51, the air pressure within each air-mounted isolator 17 will be adjusted dynamically and maintained at fixed valve. Therefore, the air-mounted base 21 can always be maintained horizontally.

By removing the throttling valves 51 and the exhaust muffler 57, it is possible to have the configuration by which the air flows directly from each fine regulating pressure reducing valve 49 to each air-mounted isolator 17. However, in each fine regulating pressure reducing valve 49 an extremely small leak of compressed air occurs, and as time passes, each air-mounted isolator 17 becomes swelled and its height becomes elevated so that it is difficult to maintain the air-mounted base 21 in a horizontal position. Accordingly, it is not desirable to remove the throttle valves 51 and the discharge muffler 57.

From the above explanation of such an embodiment it is seen that by means of the present invention, the propagation of vibrations from the blower to the frame of the laser generator can be prevented; and it is easy to horizontally maintain the air-mounted base supporting the blower. In addition, because the blower moves along the guide rails on the air-mounted base, the blower can be easily removed from the side of the frame of the laser generator for routine maintenance.

Although the invention has been described in its preferred embodiments, it is to be understood that various changes and modifications may be made within the purview of the appended claims without departing from the true scope and spirit of the invention in its broader aspects.

What is claimed is:

1. A blower support device including means for supporting a blower on a frame of a laser generator comprising:
   a plurality of air-mounted isolators disposed on horizontal portions of the frame of the laser generator;
   an air-mounted base having a surface supported by the plurality of air-mounted isolators; and
   means provided on the air-mounted base for supporting the surface of the air mounted base wherein the blower supporting means comprises a plurality of guide rails provided on the air-mounted base and a plurality of wheels provided on the blower and engaged with the guide rails.

2. The blower support device for a laser generator of claim 1, further comprising an air pressure and regulating means connected with said air-mounted isolators, wherein the pressure of the air supplied to the plurality of air-mounted isolators is individually and freely regulated and air pressure is always supplied.

* * * * *